(12) United States Patent
He et al.

(10) Patent No.: US 7,417,983 B2
(45) Date of Patent: Aug. 26, 2008

(54) DECENTRALIZED ARCHITECTURE AND PROTOCOL FOR VOICE CONFERENCING

(75) Inventors: Li-wei He, Redmond, WA (US); Dinei A. Florencio, Redmond, WA (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 11/277,905

(22) Filed: Mar. 29, 2006

(65) Prior Publication Data

US 2007/0237099 A1  Oct. 11, 2007

(51) Int. Cl.
 *H04L 12/66* (2006.01)
(52) U.S. Cl. ........................... 370/352; 370/260
(58) Field of Classification Search .................. 370/235, 370/260–263, 270–271, 362–365
See application file for complete search history.

(56) References Cited

U.S. PATENT DOCUMENTS

| | | | |
|---|---|---|---|
| 6,418,125 B1 * | 7/2002 | Oran | 370/266 |
| 6,697,614 B2 * | 2/2004 | Dorenbosch | 455/416 |
| 2001/0053132 A1 * | 12/2001 | Attimont et al. | 370/260 |
| 2007/0133437 A1 * | 6/2007 | Wengrovitz et al. | 370/260 |

OTHER PUBLICATIONS

Elad, M., Y. Hel-Or and R. Keshet, Pattern detection using a maximal rejection classifier, Pattern Recognition Letters, Oct. 2002, pp. 1459-1471, vol. 23, No. 12.

Smith, P. J., Voice conferencing over IP networks, Master's thesis, Jan. 2002, McGill University, Montreal, Canada.

Smith, P. J., P. Kabal and R. Rabipour, Speaker selection for tandem-free operation VOIP conference bridges, Proc. IEEE Workshop Speech Coding, Oct. 2002, pp. 120-122.

Smith, P. J., P. Kabal, M. L. Blostein, R. Rabipour, Tandem-free VoIP conferencing: A bridge to next-generation networks, Communications Magazine, May 2003, pp. 136-145, vol. 41, No. 5, McGill Univ., Montreal, Que., Canada.

He, L.-W., D. Florencio, J. Xun Xu, Peer-aware ranking of voice streams, Microsoft U.S. Appl. No. 11/277,932, filed Mar. 29, 2006.

* cited by examiner

*Primary Examiner*—Suhan Ni
(74) *Attorney, Agent, or Firm*—Lyon & Harr, L.L.P.; Craig S. Fischer

(57) ABSTRACT

A decentralized computer network architecture and method that gathers metadata from local and remote clients and, based on that metadata, locally makes a decision whether to send a packet over the network. Each client listens to what other clients are doing, and only sends when the total number of concurrent speakers is below some threshold. In a multi-party voice conferencing embodiment, the threshold is a number of concurrent speakers that is restricted to less than a certain number. Under the decentralized computer network architecture, the type of network topology used to connect the clients is flexible, as long as each client is running a peer-aware system to decide locally whether to send their packets. The decentralized computer network architecture and method is distributed to run on each client, making it suitable for a wide variety of network topologies (such as full-mesh, bridge-based, or a hybrid of the two).

19 Claims, 11 Drawing Sheets

DECENTRALIZED ARCHITECTURE AND PROTOCOL FOR VOICE CONFERENCING

BACKGROUND

Voice over Internet Protocol (VoIP) enables use of the Internet as a transmission medium for telephone calls instead of using the traditional Public Switched Telephone Network (PSTN). VoIP sends voice data in packets using the Internet Protocol (IP). Voice data for each call participant is contained in a voice stream. VoIP is quickly gaining popularity due to the proliferation of broadband connections to homes and the availability of low-cost hardware and software. Despite the rise in popularity, in order to compete with PSTN, VoIP must provide the functionality offered by PSTN, such as multi-party voice conferencing.

Multi-party voice conferencing is a conference between multiple participants in which voice data is transmitted to each participant. The participants often are located at different sites. For a PSTN voice conference, each participant's telephone is connected to a central bridge, which mixes and sums all of the voice signals and transmits the voice sum back to the participants. When migrating to VoIP, it is natural to try and emulate this topology in the digital domain. However, various problems arise with this client-bridge topology. Using the client-bridge topology in a VoIP voice conference, the voice data of each participant is transmitted over a wide-area network (such as the Internet), and each participant is connected to the network using a client. The Internet, however, introduces variable delays and packet losses into the network transmission process. Another problem is that the client-bridge topology places a high demand on the bridge. In particular, the bridge must decode the clients' voice packets, sum them, compress, and send summed and compressed voice packets back to each client. Because each client requires his own voice to be subtracted from the sum, the packet compression usually has to be done separately for each individual client. Because of these problems, the load on the bridge increases linearly to the number of clients that are connected to the bridge. This type of topology puts the scaling burden onto the central bridge, but the requirement for CPU processing power and bandwidth on each client is low.

A simple way to avoid the above-mentioned problems with the client-bridge topology is to connect each of the clients together. This is known as the full-mesh topology. However, one of the main problems with the full-mesh topology is that it does not scale well. In fact, the number of connections goes up as $O(N^2)$. Thus, although the full-mesh topology works well for a small number of participants, scaling to a larger number of participants is not good.

In order to be able to scale well and avoid the degradation of the client-bridge topology, another type of topology recently introduced is the tandem-free operation (TFO). Tandem refers to the double encoding that is performed on the packets. TFO operates by sending a packet to the bridge, and, instead of decoding, adding, and sending the packets back to the listener, the packets are merely forwarded by the bridge. Thus, the bridge becomes a simple forwarding device.

One problem, however, with the TFO topology is that the bridge is forced to reserve a significant amount of resources to deal with the worst case scenario of being flooded by incoming packets. This occurs because many external factors, such as microphone quality, the microphone's position relative to the user's mouth, the gain of the sound card, the level and type of background noise or simply many people start to talk at the same time, are out of the control of the bridge. This need to hold so much bandwidth in reserve to deal with the fluctuation in the number of incoming packets tends to negate at least some of the cost savings and other advantages of adopting the TFO topology.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The decentralized computer network architecture and method disclosed herein gathers metadata from clients on a computer network and, based on that metadata, locally makes a decision whether to send a packet over the network. When a client does decide to send the packets, its packets can suppress other clients from sending their packets if the conference already has more than a pre-set number of speakers.

In the embodiments using multi-party voice conferencing, the decentralized computer network architecture and method substantially reduces the amount of packet fluctuation by restricting the number of concurrent speakers to be less than a pre-set number (such as 3 speakers) during a multi-party voice conference regardless of its size. The decentralized computer network architecture and method is based on the observation that in a natural conservation, it is rare that more than 3 people speak at the same time. And even when that happens, it is not likely that all of them can be understood clearly, so it is less important to transmit all of them. Only a subset of them needs to be selected based on a ranking algorithm. While allowing a healthy number of concurrent speakers preserves the natural dynamics of a conversation, having a pre-set limit enables the receivers to deal with a more predicable number of packets.

The decentralized computer network architecture and method has a major difference from other types of topologies in that the enforcement of such a restriction is distributed. A peer-aware system is run on each client. Like traditional topologies, the client makes the decision on whether to send a voice packet or not. But unlike the traditional topologies, a packet not only has to pass the client's own speech/silence test, but also is compared to metadata of the packets that the client is currently receiving from participating remote clients. Thus the packets that can be sent from each client are a subset of the packets sent. Conceptually similar to the Ethernet protocol, when a client does decide to send the packets, its packets can suppress other clients from sending their packets if the conference already has more than a pre-set number of speakers.

Since the decentralized computer network architecture and method is a distributed system, it has a number of benefits comparing the client-bridge topology. First, the client sends fewer packets so bandwidth utilization is more efficient on both the client and the bridge. Second, using the decentralized computer network architecture and method offloads some CPU processing from the bridge. Third, since the client knows the number of concurrent speakers, it can encode the packets at a different bit rate so the total bandwidth from all those speakers is fixed. In order to accomplish this using a bridge-based algorithm will require a scalable audio codec. And, fourth, the decentralized computer network architecture and method can be applied to a variety of network topologies (such as client-bridge, full mesh, or a hybrid of the two), thus allowing the benefits of speaker selections to be applied to more voice conferencing scenarios.

The decentralized computer network architecture and method also is distinguished from the conventional full-mesh topology in that the clients are more intelligent and able to decide whether to send out packets based on the states of both itself and its peers. And, similar to the TFO topology, the number of concurrent speakers is limited. However, since our architecture and method is decentralized, speaker selection is done separately by each client, unlike the TFO topology, where the bridge performs the task. Thus, the decentralized computer network architecture and method distributes the computing and bandwidth load on a TFO bridge such that the bridge has lower incoming bandwidth needs. In this way, the decentralized computer network architecture and method absorbs the merits of both the full-mesh and TFO topologies, rendering a VoIP conferencing system with better scalability, lower bandwidth occupation and lower jitter buffer delay. Also, to avoid a great deal of bandwidth in reserve, the decentralized computer network architecture and method selects the top few speakers that it receives and only forwards the packets of those top few speakers. This means that the bridge in the decentralized computer network architecture does not need to decode the packets entirely, or to fully decode the incoming signal. Each client can compute its own VAS and embed the VAS into the packets themselves. Instead of having the bridge fully decode packets and compute the score, the decentralized computer network architecture and method takes pre-computed scores, select packets from the top-ranked speakers, and forward those packets.

Some embodiments of the decentralized computer network architecture and method use a peer-aware voice stream ranking technique to both score local content and rank the local client as compared to other clients on the network. The peer-aware voice stream ranking technique computes a voice activity score (VAS) for each audio packet. The VAS quantifies the level of voice activity of the audio frame encoded in this packet. Each time a client captures an audio frame from the recording device (such as a microphone), its VAS is computed. Subsequently, silence suppression is performed for current audio frame by comparing its VAS with a threshold. If the VAS is below the threshold, the audio frame is considered as noise and discarded immediately. Otherwise, the client further compares its own VAS with those of its peers, which it obtained from the incoming packets. If the client finds itself ranked among the top M clients, it encodes the audio frame and sends out the packet (with the VAS embedded in) towards all other clients. Otherwise, the audio frame is discarded.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 1 illustrates a client-bridge embodiment of the decentralized computer network architecture FIG. 2 illustrates a full-mesh embodiment of the decentralized computer network architecture FIG. 3 illustrates a hybrid client-bridge and full-mesh embodiment of the decentralized computer network architecture FIG. 4 illustrates an exemplary embodiment of the peer-aware system shown on the clients in FIGS. 1-3.

DETAILED DESCRIPTION

In the following description of the decentralized computer network architecture and method, reference is made to the accompanying drawings, which form a part thereof, and in which is shown by way of illustration a specific example whereby the decentralized computer network architecture and method may be practiced. It is to be understood that other embodiments may be utilized and structural changes may be made without departing from the scope of the claimed subject matter.

I. Decentralized Computer Network Architecture

The decentralized computer network architecture is a system that gathers metadata from local and remote clients and, based on that metadata, locally makes a decision whether to send a packet over the network. In a multi-party voice conferencing embodiment, the number of concurrent speakers is restricted to less than a pre-set number (such as 3). The enforcement of such restriction, however, is distributed, with peer-aware techniques running on each participating client. Like regular silence suppression, the local client makes the decision on whether to send a voice packet or not. But unlike the normal silence suppression, the packet not only has to pass the client's own speech/silence test, but is also dependent on the Voice Activity Scores (VAS) of the packets that the client is currently receiving. Thus, the packets that can be sent from each client is a subset of the packets sent on a normal silence suppressed client. When a client does decide to send the packets, its packets can suppress other clients from sending their packets if the conference already has more than a pre-set number of speakers.

Under the decentralized computer network architecture, the type of network topology used to connect the clients is flexible, as long as each client is running a peer-aware system to decide locally whether to send their packets. The peer-aware system takes into account not only local metadata by also remote metadata from remote client on the network. The clients can all connect to a bridge which decodes, mixes, and re-encodes the audio packets from the clients. Or the clients can form connect to each other and form a full-mesh. Or an application-level distribution tree can be formed among the clients. Each of these embodiments of the decentralized computer network architecture will now be discussed.

Client-Bridge Embodiment

Figure 1:
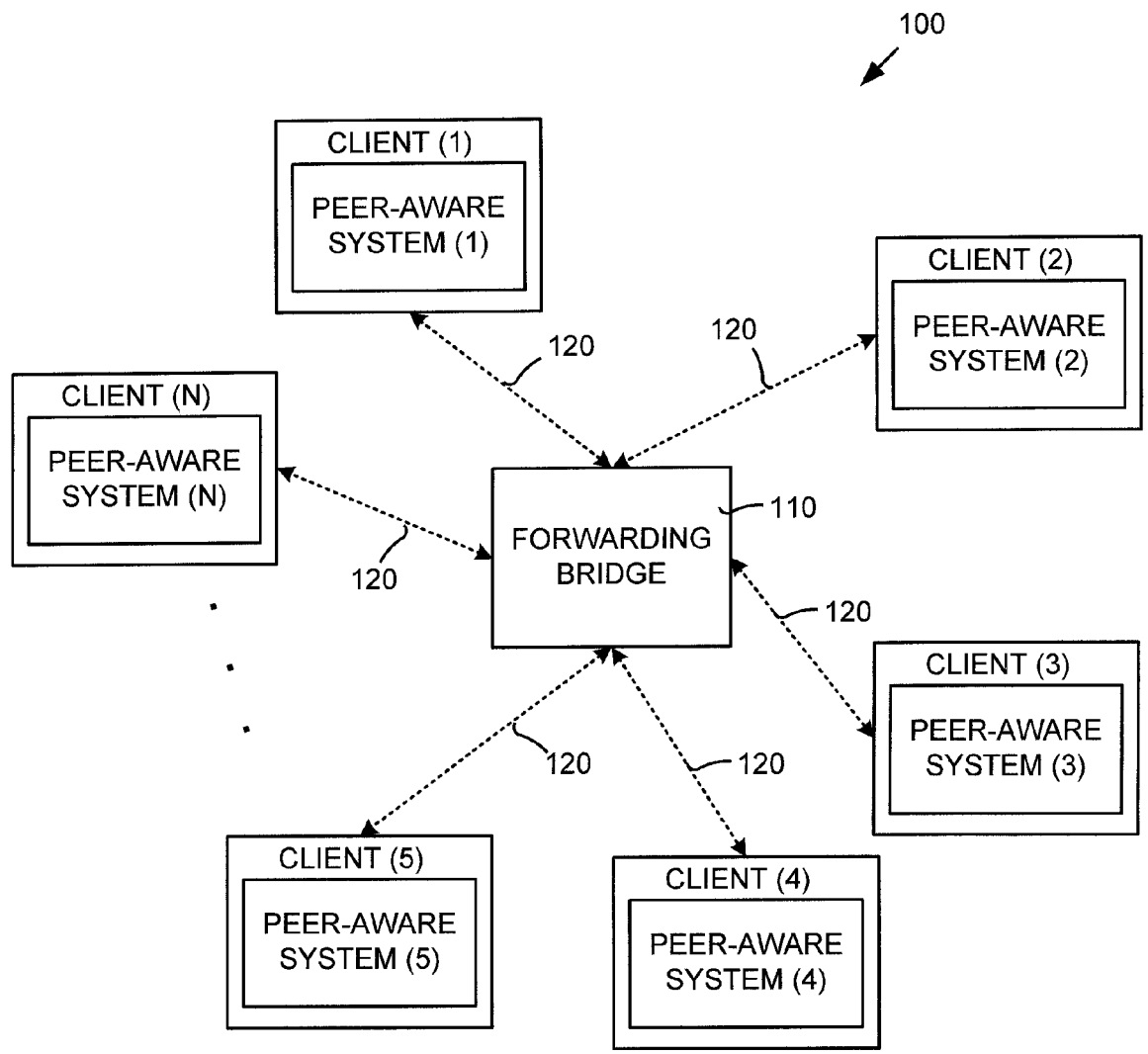

FIG. 1 illustrates a client-bridge embodiment of the decentralized computer network architecture 100. In general, the architecture 100 includes at least one forwarding bridge 110 and a plurality of clients. It should be noted that for convenience only one forwarding bridge 110 is shown in FIG. 1.

The forwarding bridge 110 as used in the architecture 100 performs forwarding of packets, and not mixing. In contrast, the traditional bridge in a client-bridge topography performs both forwarding and mixing.

More specifically, in the exemplary embodiment shown in FIG. 1 there are N clients. Client (1), client (2), client (3), client (4), and client (5) to client (N) are illustrated. It should be noted that N may be equal to at least 2, and often is higher. In one embodiment, N is equal to at least 2. The clients are in communication with the forwarding bridge 110 through a first communication means 120 (shown by the dotted lines). By way of example, this first communication means may be wired or wireless. Each of the clients contains a peer-aware system, which is described in detail below.

Full Mesh Embodiment

Figure 2:
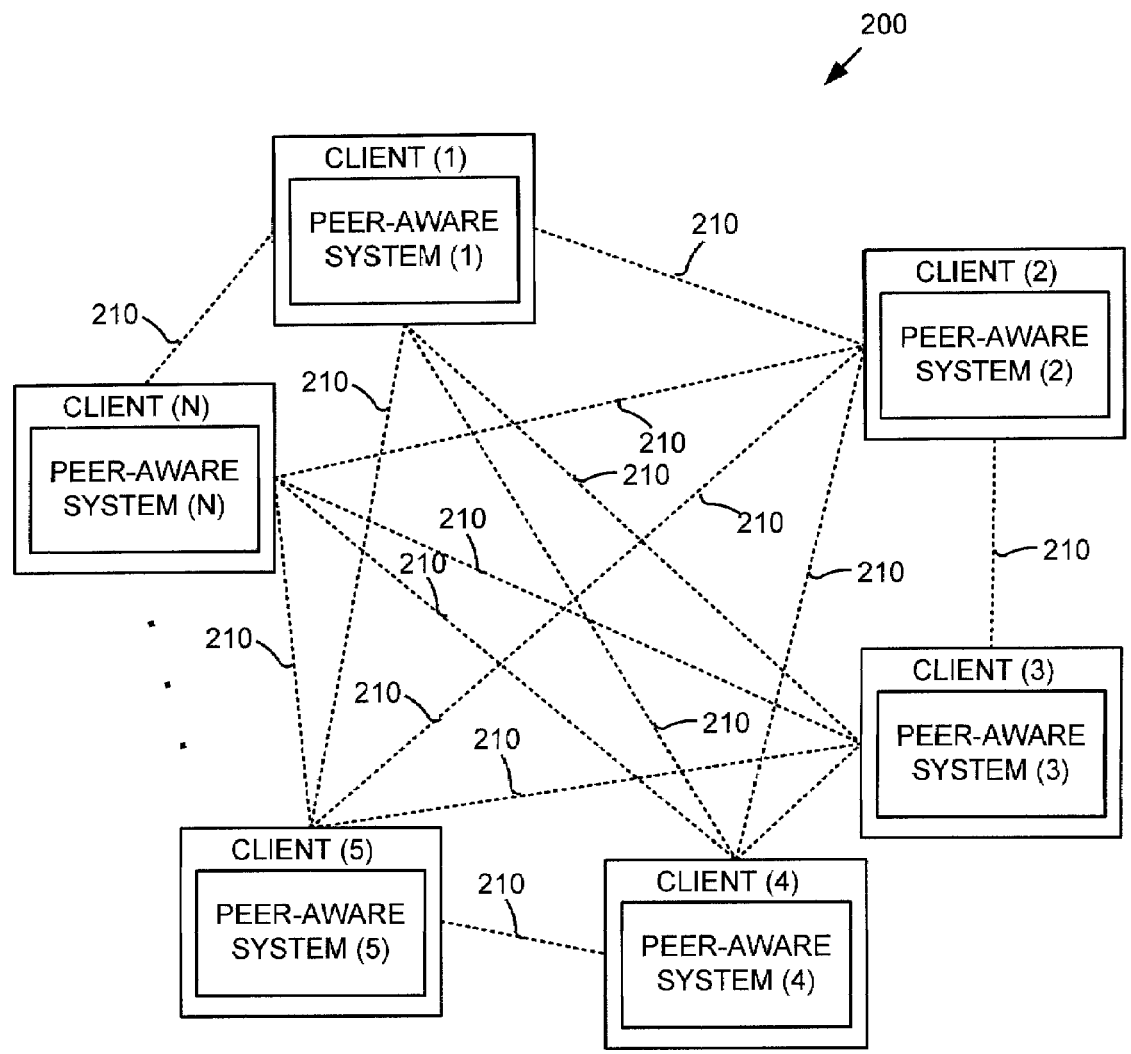

FIG. 2 illustrates a full-mesh embodiment of the decentralized computer network architecture 200. In this embodiment, there is no bridge and each of the clients is in communication with each other. More specifically, a plurality of clients, client (1), client (2), client (3), client (4), and client (5) to client (N) is illustrated. It should be noted that N may be equal to at least 2, and often is higher. Once again, in one embodiment, N is equal to at least 2.

The clients are in communication with each other through a second communication means 210 (shown by the dashed lines). By way of example, this second communication means may be wire or wireless. Each of the clients contains a peer-aware system, which is described in detail below.

Hybrid Client-Bridge and Full Mesh Embodiment

Figure 3:
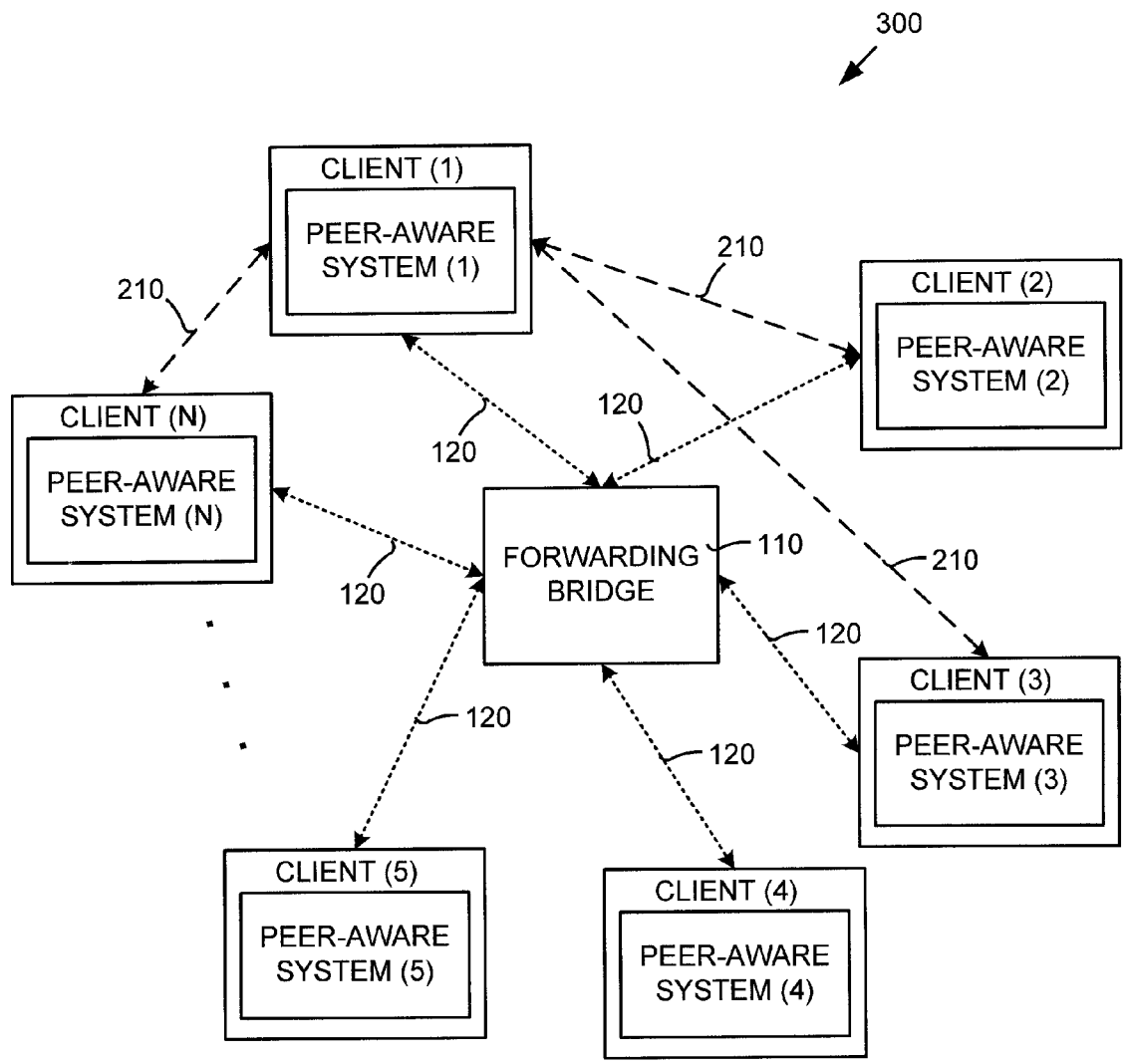

FIG. 3 illustrates a hybrid client-bridge and full-mesh embodiment of the decentralized computer network architecture 300. This hybrid or "on-the-fly" topology can be used because in the decentralized computer network architecture each client listens to what other participants are doing, and only sends when agreed upon. This embodiment contains the forwarding bridge 110 and a plurality of clients, client (1), client (2), client (3), client (4), and client (5) to client (N). As with the other embodiments, it should be noted that N may be equal to at least 2, and often is higher, with N is equal to at least 2 in one embodiment.

The clients are in communication with the forwarding bridge 110 through the first communication means 120 (shown by the dotted lines). In addition, it is possible for a client to establish direct communication with another client, thereby bypassing the forwarding bridge 110. Direct communication is established through the second communication means 210 (shown by the dashed lines). Each of the clients contains the peer-aware system described below.

II. Peer-Aware System

Each participating client in the decentralized computer network architecture includes a peer-aware system. In general, the peer-aware system allows a client to locally decide whether to send local content out on the network or to withhold sending. In addition, if the local content is sent, then the peer-aware system allows the local client to inhibit some of the other participating clients from sending their content, based on how many clients are already sending content.

Figure 4:
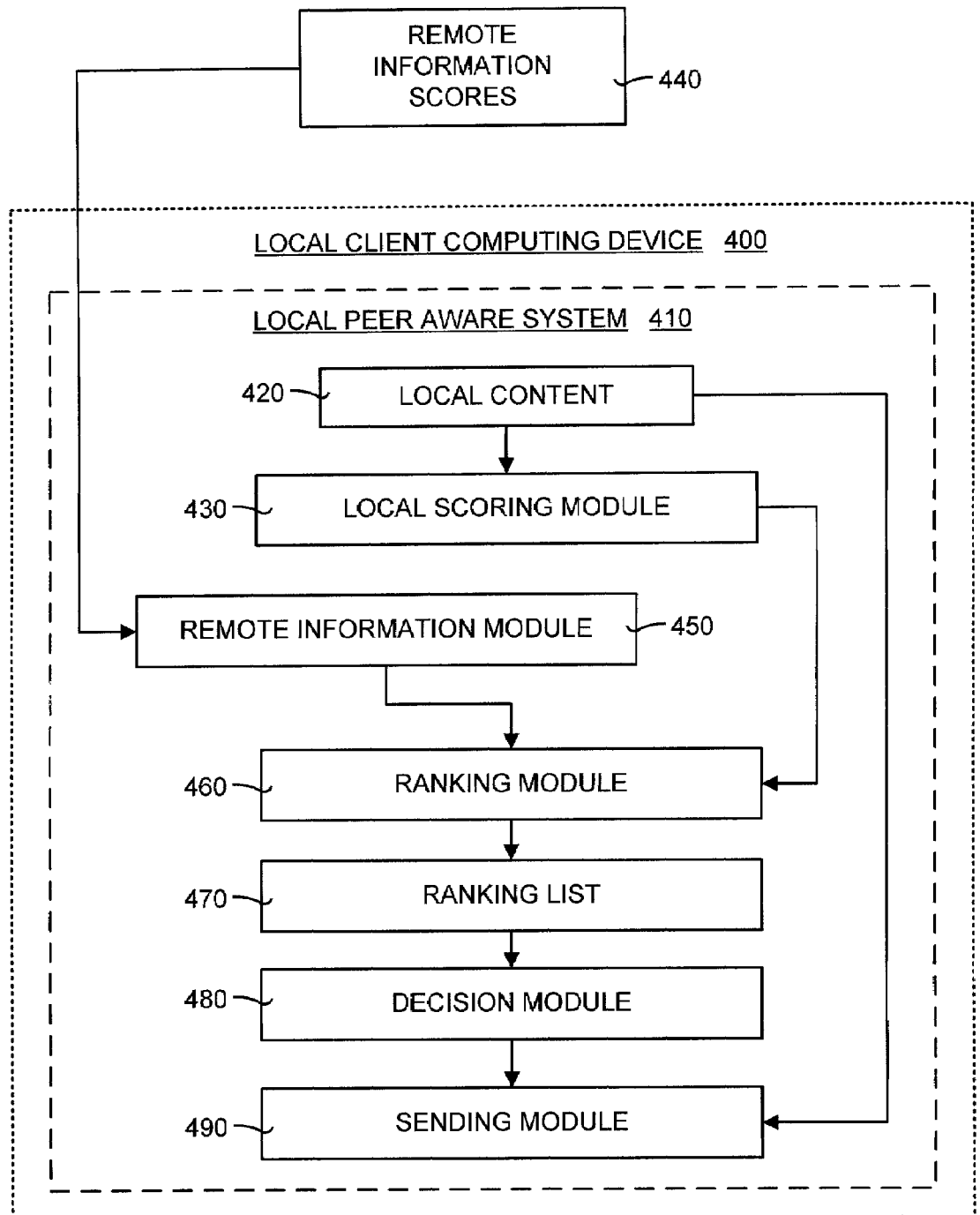

In particular, FIG. 4 illustrates an exemplary embodiment of the peer-aware system shown on the clients in FIGS. 1-3. In this exemplary embodiment, the peer-aware system is shown implemented on a local client computing device 400 (shown by the dotted lines). The peer-aware system is designated as a local peer-aware system 410 (shown by the dashed lines) to signify that it resides on the local client computing device 400.

The local peer-aware system 410 includes local content 420 residing on the local client computing device 400. The local content 420 contains packets of data (not shown). The local content 420 is input to a local scoring module 430. The local scoring module 430 analyzes the local content 420 and assigns a local information score (not shown). In one embodiment, the scoring is assigned using a peer-aware voice stream ranking method, discussed in detail below. The output of the local scoring module is a local information score associated with the local content. This local information score can be sent to other participating clients on the network.

Meanwhile, the remote clients in the decentralized computer network architecture are also processing their content using a peer-aware system running on their respective devices. The output of this processing is remote information scores 440, which are received by a remote information module 450 on the local client computing device 400. The local information score and the remote information scores 440 are used by a ranking module 460 to produce a ranking list 470. The ranking list 470 is a ranking of the local client computing device 400 and the remote clients. The ranking list 470 is used by a decision module 480 to decide locally whether and when to send the local content over the network. This decision is based on the local and remote information scores, and, more specifically, based on the ranking list 470. In one embodiment, the ranking of the clients is compared to a simultaneous speaker value, as discussed in detail below. If the decision is made to send the local content 420, then a sending module 490 delivers the local content 420 to the computer network.

III. Operational Overview

Figure 5:
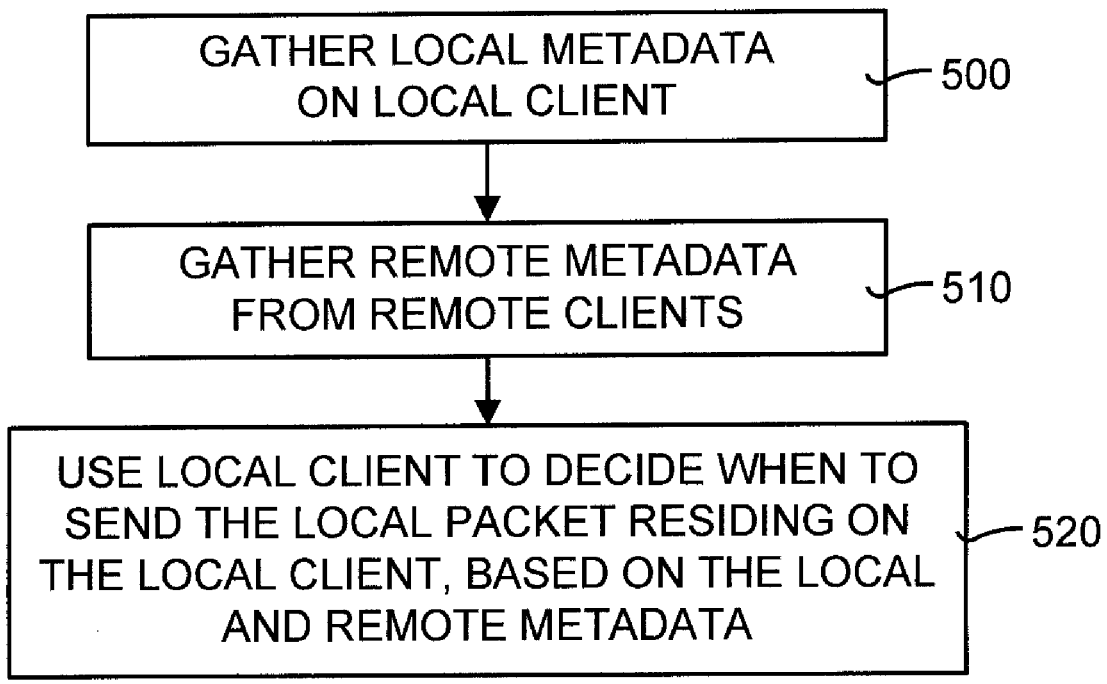
FIG. 5 is a general flow diagram illustrating the general operation of the decentralized computer network architecture shown in FIGS. 1-4.

FIG. 5 is a general flow diagram illustrating the general operation of the decentralized computer network architecture shown in FIGS. 1-4. In general, the decentralized computer network method uses a client to make a decision locally whether and when to send local content based on information from the local client and participating remote clients on the network. More specifically, as shown in FIG. 5, the decentralized computer network method gathers local metadata (box 500). The local client contains local packets of data. The local metadata gathered is information about the local packet. In one embodiment, the local packet is an audio packet, and the local metadata is a voice activity score (VAS) for the local packet. The computation of the VAS is described in detail below.

Next, the local client gathers remote metadata from the participating remote client on the network (box 510). In one embodiment, the remote metadata are voice activity scores for packets on the remote clients. These remote voice activity scores are computed by the respective remote clients and sent to the local client over the network. The local client then decides whether and when to send the local packet residing based on the local and remote metadata (box 520). In one embodiment, application is voice conferencing and a simultaneous speaker value, M, is defined, where M indicates the number of simultaneous speakers in the voice conference. If the local client is ranked in the top M speakers, then the local packet is sent over the network.

Both the client-bridge and hybrid embodiments also can use a variable threshold (or simultaneous speaker value). In particular, given computing power, available bandwidth, and current traffic, the simultaneous speaker value can vary. If the bridge is handling many simultaneous sessions, the threshold of the number of concurrent speakers in a session is low.

However, if the bridge is handling very few simultaneous sessions, then the threshold can be higher. It should be noted that the variable threshold only makes sense in the client-bridge and hybrid embodiments, or any other type of topology that contains a bridge.

Figure 6:
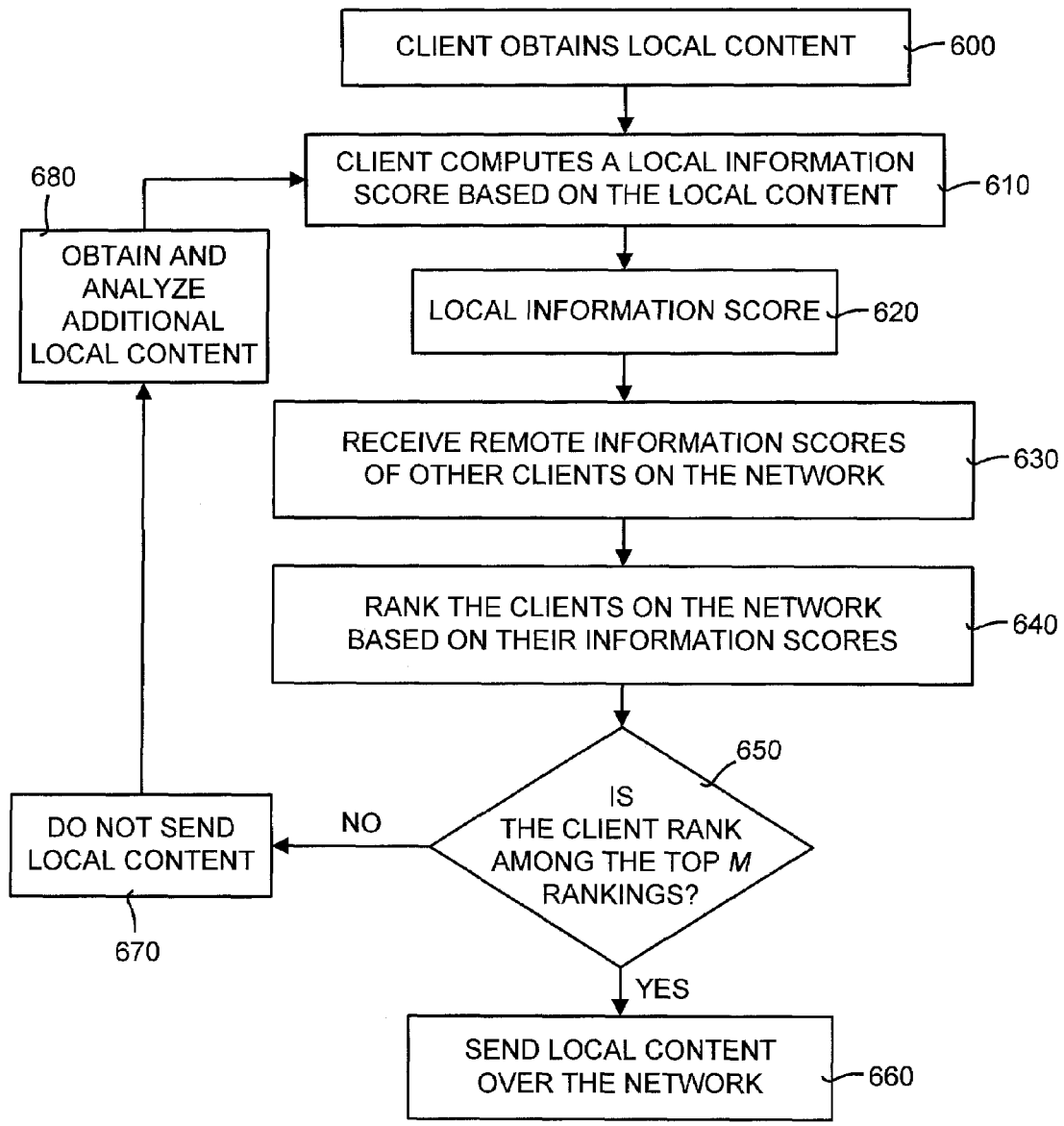
FIG. 6 is a detailed flow diagram illustrating the details of the operation of the decentralized computer network method shown in FIG. 5.

FIG. 6 is a detailed flow diagram illustrating the details of the operation of the decentralized computer network method shown in FIG. 5. The operation begins by having the client obtain its local content (box 600). Next, the client used a scoring technique to compute a local information score (or metadata) for itself based on the local content (box 610). One embodiment, the peer-aware voice stream ranking technique described in detail below is used to compute a voice activity (or information) score. The local information score is output (box 620). The client receives remote information scores (or metadata) from participating remote clients on the network (box 630). In addition to receiving the remote information scores, the client may also receive content from the remote clients.

The local and remote information scores then are used to rank the clients using a ranking technique (box 640). One embodiment, the peer-aware voice stream ranking technique described in detail below is used to rank the clients. A determination then is made as to whether the client is ranked among the top M rankings (box 650). If yes, then the local content is sent over the network (box 660). For example, if M=3, this means that if the client is ranked in the top 3 then the local content is sent. Otherwise, the local content is not sent (box 670). Additional local content then is obtained and analyzed using the procedure outlined above (box 680).

Voice Conferencing Embodiment

In the embodiment whereby the decentralized computer network architecture and method is used for multiparty voice conference, each participating client is running the peer-aware system. By running this system, the number of concurrent speakers is restricted to a pre-set number (such as 3 speakers). Compared to a conventional silence suppression algorithm, the cost of CPU/bandwidth for the mixer is lower. In addition, the variation of the CPU/bandwidth cost to the mixer due to ineffective silence suppression on some clients is reduced. Since the architecture is distributed, the topology for connecting the clients can be very flexible. They can be centrally connected to a bridge, connected to each other in a full mesh, or form an application level distribution tree.

In multi-party voice conferencing over Internet Protocol (IP), there typically is a mixer that connects to multiple participating clients and mixes the audio from multiple streams. Regardless whether the mixer in a central bridge or on individual participating client, the cost of CPU and bandwidth for the mixer increases linearly to the number of clients it is connected to. In order to reduce these costs, silence suppression is often used on the clients. By sending out audio packets only when actual speech is detected from the microphone, the mixer only needs to receive and mix those packets that contain actual voice. Thus the cost of CPU and bandwidth on the mixer is reduced substantially. However, the amount of CPU and bandwidth savings depends on the effectiveness of the silence suppression algorithm on the clients which itself depends on factors such as microphone quality, its position relative to the user's mouth, the gain of the sound card, the level and type of background noise. Many of those factors are not controllable by the mixer. Sometimes, the mixer may be overwhelmed by the amount incoming packets and causes audio hiccup during playback.

In the voice conferencing embodiments, each audio packet contains a voice activity score (VAS), which quantifies the level of voice activity (not simply the volume) of the audio frame encoded in this packet. Each time a client captures an audio frame from the recording device (such as a microphone), it computes the VAS for it. Subsequently, silence suppression is performed for current audio frame by comparing its VAS with a threshold. If the VAS is below the threshold, the audio frame is considered as noise and discarded immediately. Otherwise, the client further compares its own VAS with those of its peers, which it obtained from the incoming packets. If the client finds itself ranked among the topmost M clients, it encodes the audio frame and sends out the packet (with the VAS embedded in) towards all other clients. Otherwise, it knows at once that it does not have the chance to be heard, and thus discards the audio frame.

The computational load when using the decentralized computer network architecture and method is quite low. The only relatively computation-intensive routine is the calculation of VAS. However, each client only needs to calculate its own VAS, since the VAS of the remote client (or peers) can be obtained through partial decoding of their incoming packets. Of course, in order to replay the audio signals of the peers, the local client also needs to decode the incoming packets and mix the signals. But recall that since the number of concurrent speakers is bounded by M, decoding and mixing only need to be done for at most M peers. In a working example conducted on a Pentium 4 3.2 GHz desktop PC, the entire client consumed only about 3% of its CPU time.

IV. Peer-Aware Voice Stream Ranking

Figure 7:
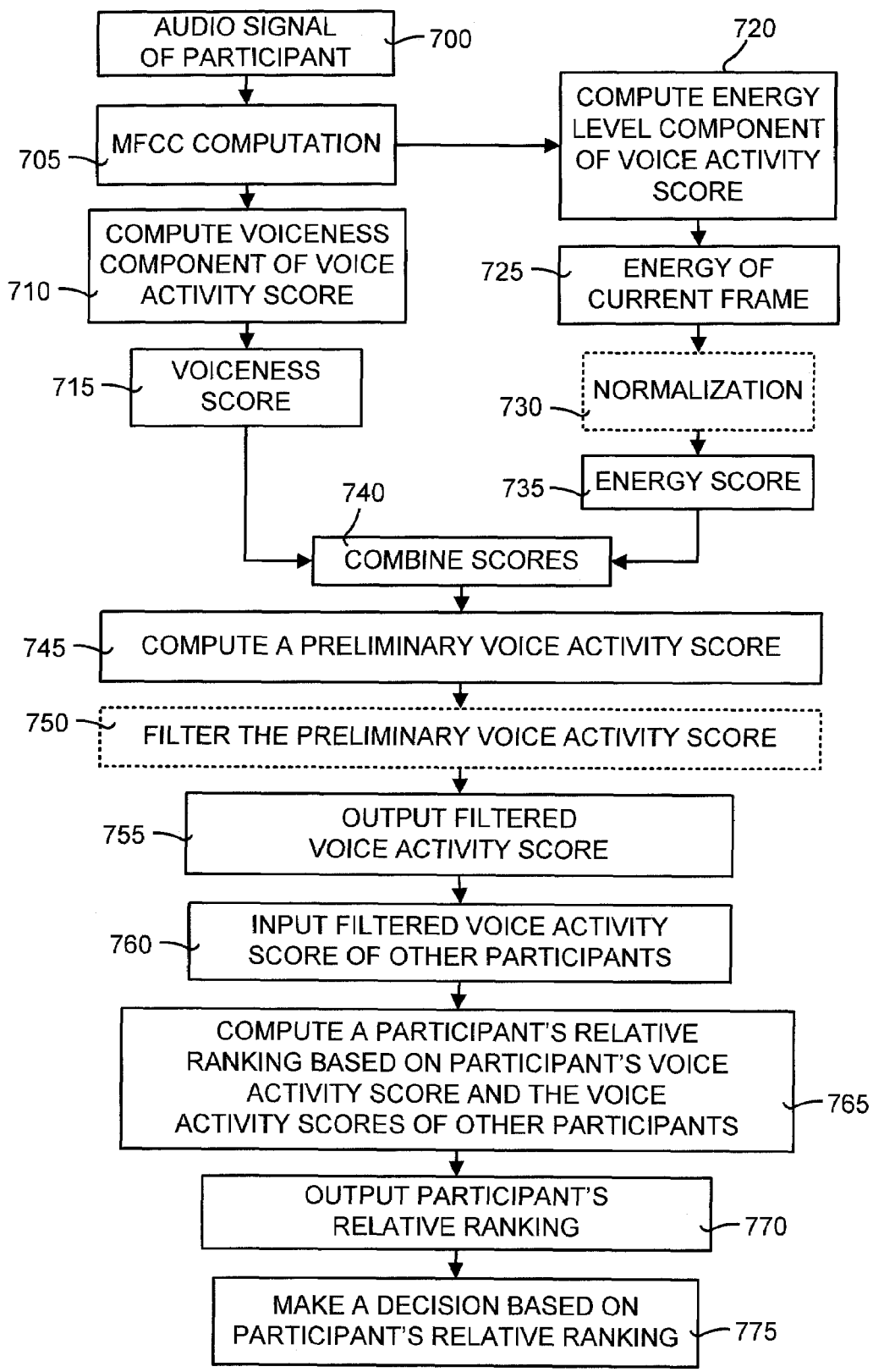
FIG. 7 is a detailed flow diagram illustrating the operation of a peer-aware voice stream ranking method.

FIG. 7 is a detailed flow diagram illustrating the operation of a peer-aware voice stream ranking method. In several embodiments used for voice conferencing, this method can be used to both compute information scores for content and to rank clients.

Referring to FIG. 7, the client performing the analysis inputs its own audio signal (box 700). In one embodiment, computation of the client's VAS then is computed as follows. For each audio frame of the audio signal, a Mel-Frequency Cepstral Coefficients (MFCC) computation is performed on the audio signal (box 705). The MFCC results are used to compute the voiceness component of the VAS, and to determine whether each audio frame is classified as "voice" or "noise" (box 710). The result is a voiceness score that indicates the likelihood that the audio frame contains speech or voice (box 715).

The MFCC computation also contains energy data that is used to compute the energy level component of the VAS (box 720). The details of this computation are discussed below. In general, however, the energy of a current frame is obtained from the MFCC computation (box 725). Next, in an alternate embodiment, the current frame energy is normalized using the long-term average of energy for a current speaker (box 730). This normalization is explained in detail below. As indicated by the dashed lines of box 730, the normalization process is optional. The output is the energy score, which indicates the ratio of current frame energy to the long-term average of energy for a current speaker (box 735).

The voiceness score and the energy score then are combined (box 740). The result of the combination is a preliminary VAS (box 745). In an alternate embodiment, the preliminary VAS is filtered (box 750). This filtering process is described in detail below. As indicated by the dashed lines of box 750, the filtering process is optional. If filtering is performed, then the output is a filtered VAS (box 755). The filtered VAS of each of other participants is obtained and used (box 760). More specifically, a relative ranking of the participant is computed based on the VAS of the participant and the VAS of other participants (box 765). The participant's relative ranking is output (box 770), and a decision is made based on the participant's relative ranking (box 775). By way of example, decisions that may be made may include whether to send a packet or how much bandwidth to allot to each participant based on the participant's ranking.

As noted above, the voice activity score (VAS) includes two components. A first component includes the voiceness component, which indicates the likelihood that the audio frame contains speech or voice. The second component includes the energy level component, which indicates the ratio of current frame energy to the long-term average of energy for a current speaker. The calculation of each component now will be discussed.

Voiceness Component Calculation

A natural choice for the quantity measuring the voice activity of an audio frame is its energy. Quantifying voice activity with frame energy involves the assumption that background noises have a much lower energy level as compared to voice. However, this assumption is not always valid. For example, a user may use a cheap microphone having a low signal-to-noise ratio (SNR) and capture many environmental noises. Furthermore, some noises (such as a user's breathing) have a high-energy level. Therefore, many noises cannot be well discriminated from true voice by considering only frame energy.

The voiceness component of the VAS can be computed in a variety of ways. In a one embodiment, the peer-aware voice stream ranking method uses a pattern classification based method to calculate a quantity that is able to identify voice frames robustly, even in the existence of various noises with high-energy levels. In particular, for this embodiment, the voiceness component of the VAS is computed as follows. For each audio frame, the MFCC and their $1^{st}$ and $2^{nd}$ order temporal differences are concatenated, forming a 39-dimension feature vector. In order to decide whether an audio frame belongs to voice or noise, audio signals recorded in meeting rooms and offices are collected, and each audio frame is labeled as "voice" or "noise". This labeled data set is used for training.

The first step is to seek in the original D-dimensional feature space a low dimensional subspace, in which the two classes ("voice" and "noise") can be well discriminated. The most discriminative linear projection vector w* is determined by solving the equation:

$$w^* = \operatorname*{argmin}_{w} \frac{w^T R_N w}{w^T [R_N + R_V + (m_N - m_V)(m_N - m_V)^T] w},$$

where $(m_N, R_N)$ and $(m_V, R_V)$ are the mean-covariance pairs of the noise class and voice class respectively, which are calculated from the training data. This optimization problem can be solved through generalized eigenvalue decomposition. It should be pointed out that d>1 generalized eigenvectors are picked, forming a D-by-d matrix W. The column vectors of W span a d-dimensional discriminative subspace (where, in one embodiment, d=10).

The likelihood of an audio frame belonging to the noise class is given by the equation:

$$p(x|noise) \propto \exp(-\tfrac{1}{2}(x-m_N)^T K(x-m_N)),$$

where x is the D=39-dimensional feature vector for the audio frame, and $K=W(W^T R_N W)^{-1} W^T$ is a constant square matrix. The audio frame's voiceness component, which is also called a Feature-based VAS (FVAS), is defined as:

$$FVAS=(x-m_N)^T K(x-m_N). \tag{1}$$

Since it is a monotonically decreasing function of p(x|noise), a larger FVAS implies that the audio frame is less likely to be noise and more likely to be voice.

It should be noted that calculation of the voiceness component (or the FVAS) in equation (1) can be done fairly efficiently. An orthogonal diagonalization can be used such that $C=(W^T R_N W)^{-1}=U\Lambda^2 U^T$, where u is d-by-d orthogonal matrix and $\Lambda$ is diagonal. This can always be done, since c is positive semi-definite. Defining $H=(WU\Lambda)^T$, gives:

$$K=WU\Lambda^2 U^T W^T = H^T H \tag{2}$$

This allows equation (1) to be written as:

$$FVAS=\|Hx-\tilde{m}_N\|^2_1, \tag{3}$$

where $\tilde{m}_N = H m_N$ is a d-dimensional constant vector. Equation (3) means that in order to calculate the FVAS, x need only be projected to d-dimensional through H, and then calculate the Sum of Squared Differences (SSD) between the projected vector and constant vector $\tilde{m}_N$ in the d-dimensional subspace. The FVAS defined this way is able to effectively discriminate true voice and various noises, including high energy level noises, such as breathing, which cannot be suppressed using frame-energy based methods.

Energy Level Component Calculation and Normalization

If the audio signal does contain voice, then the next determination is how much energy is contained in (or how loud is) the voice. Typically, the loudness of the voice will indicate the level of energy that a person is exerting. Thus, although the voiceness component (or FVAS) can effectively differentiate voice and noises, it alone is not suitable for speaker selection since it does not directly reflect the speaker's volume.

In order to compensate for this deficiency of the FVAS, the energy level component of the VAS is introduced. The energy level component is also called "adaptively normalized frame energy", and is denoted as E. In one embodiment, normalization is used to level the playing field between the participants in a voice conference. This avoids a participant always being the primary speaker by turning up their microphone gain. In order to normalize, the peer-aware voice stream ranking method computes a long-term average of the energy. By way of example, if a participant's current voice energy is equal to the value of the long-term energy average, then their score is one. If the participant raises their voice, so that it is twice as much as the long-term energy average, then the participant's score is 2. In this manner, no matter how much that microphone gain is increased, each participant is given a level playing field.

Figure 8:
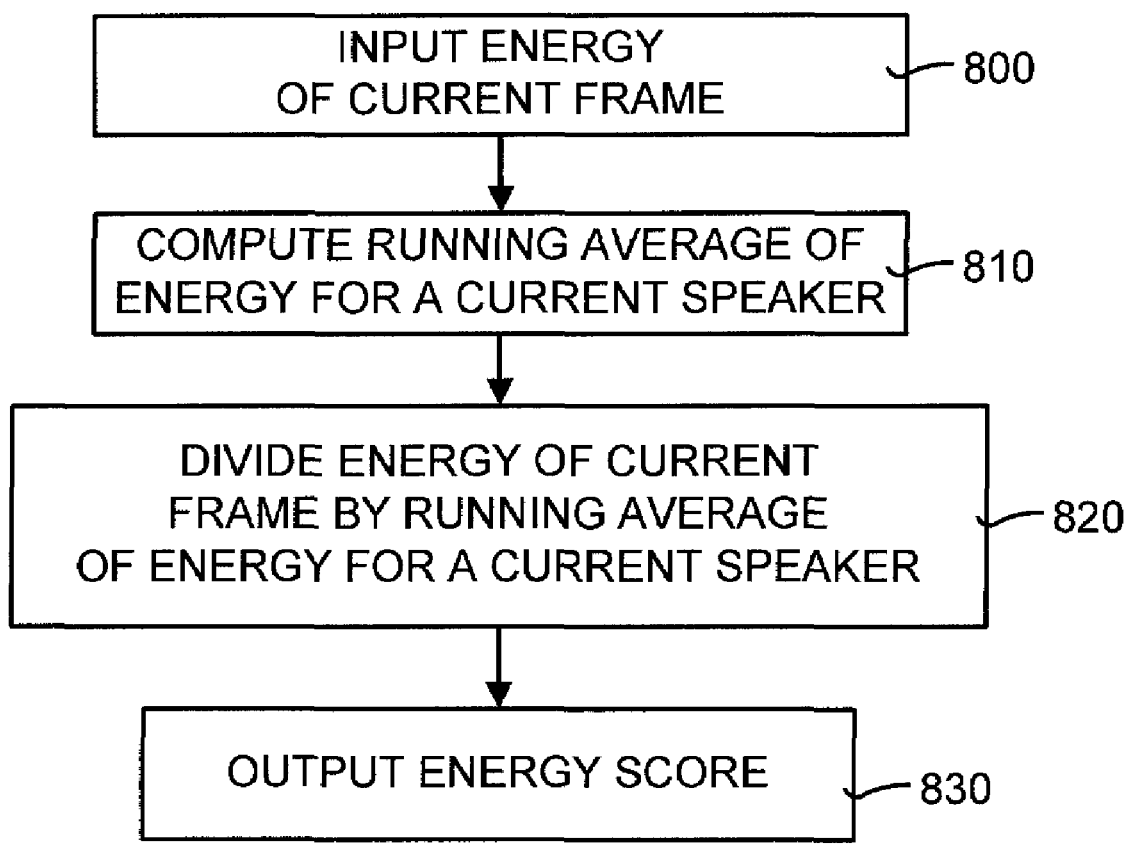
FIG. 8 is a detailed flow diagram illustrating the details of the normalization process shown in FIG. 7.

FIG. 8 is a detailed flow diagram illustrating the details of the normalization process shown in FIG. 7. In particular, the normalization process begins by inputting the computed energy of the current audio frame, E. (box 800). Next, the running average of the energy for a current speaker is computed (box 810). This running average, denoted as $\epsilon$, is the running average of voice energy. In other words, it is the average energy of the most recent audio frames that are classified as voice. By way of example, the average energy may be based on an audio frame having a time window of length $T_E$=15 seconds.

The adaptively normalized frame energy, or energy score, E, is obtained by the equation E=E/$\epsilon$, which is dividing the energy of the current frame by the running average of energy for a current speaker (box 820). It is clear that $\bar{E}$ is insensitive to the volume level because it is a normalized quantity and always varies around 1 for voice frames. On the other hand, a sudden increase in E will cause $\bar{E}$ to increase sharply, but this relatively larger $\bar{E}$ will last only for a short term till the running average $\epsilon$ follows the increase. The energy score then is output (box 830).

Calculation of a Preliminary VAS

A preliminary VAS is defined as a combination of the FVAS and $\bar{E}$:

$$VAS = k\alpha \cdot \bar{E} + (1-\alpha) \cdot FVAS \qquad (4)$$

where the weight $\alpha$ is also a function of FVAS, defined as:

$$\alpha = [1 + \exp(b - c \cdot FVAS)]^{-1}. \qquad (5)$$

Note that $0 \leq \alpha \leq 1$. In one embodiment, constants b and c in equation (5) are chosen so that for noise frames $\alpha \approx 0$ while for voice frames $\alpha \approx 1$. In another embodiment FVAS is used as VAS for noise frames. In yet another embodiment, for voice frames $k\bar{E}$ is used. Here, the constant k is used to scale $\bar{E}$ so that it is comparable with FVAS.

Filtering of the Preliminary VAS

In one embodiment of the peer-aware voice stream ranking method, a filtering process is used to avoid situations where the speaker ranking changes rapidly. For example, the audio signal containing voice can vary rapidly from one millisecond to the next, but it is undesirable for the speaker ranking to change that often. More specifically, the VAS should be smooth temporally. Smooth VAS is not only favored for accurate silence suppression and leads to less spurious speaker switching. More importantly, because each client can only compare its current VAS with a delayed version (due to network transmission) of the other participant's VAS, smooth VAS results in less decision discrepancy among clients.

Since the preliminary VAS is calculated separately for each frame, the correlation between neighboring frames has not been taken into account thus far, resulting in a quickly oscillating sequence. In one embodiment, the peer-aware voice stream ranking method smoothes this sequence through a nonlinear filtering operation:

$$VAS'[n] = \max_{k=0,1,\ldots,K} (VAS[n-k]), \qquad (6)$$

which is a unilateral morphological dilation. The filtered VAS is much smoother, since the narrow valleys in the original VAS sequence are effectively eliminated. In alternative embodiments, more complex techniques (such as such as Hidden Markov Model (HMM)) may be used to model the correlation between neighboring frames.

Barge-In Mechanism

In one embodiment of the peer-aware voice stream ranking method, a participant who is currently speaking (or "has the floor") is given a slight benefit when considering whether to allow another participant to barge in. Instead of simply sorting the participants according to their VAS and selecting the top ranked M ones, the barge-in mechanism allows a participant to interrupt only if its VAS is higher than the current speaker's VAS by certain margin. This effectively gives preference to the current speaker. In order to barge-in, a participant must be ranked higher by a certain percentage than the current speaker.

Figure 9:
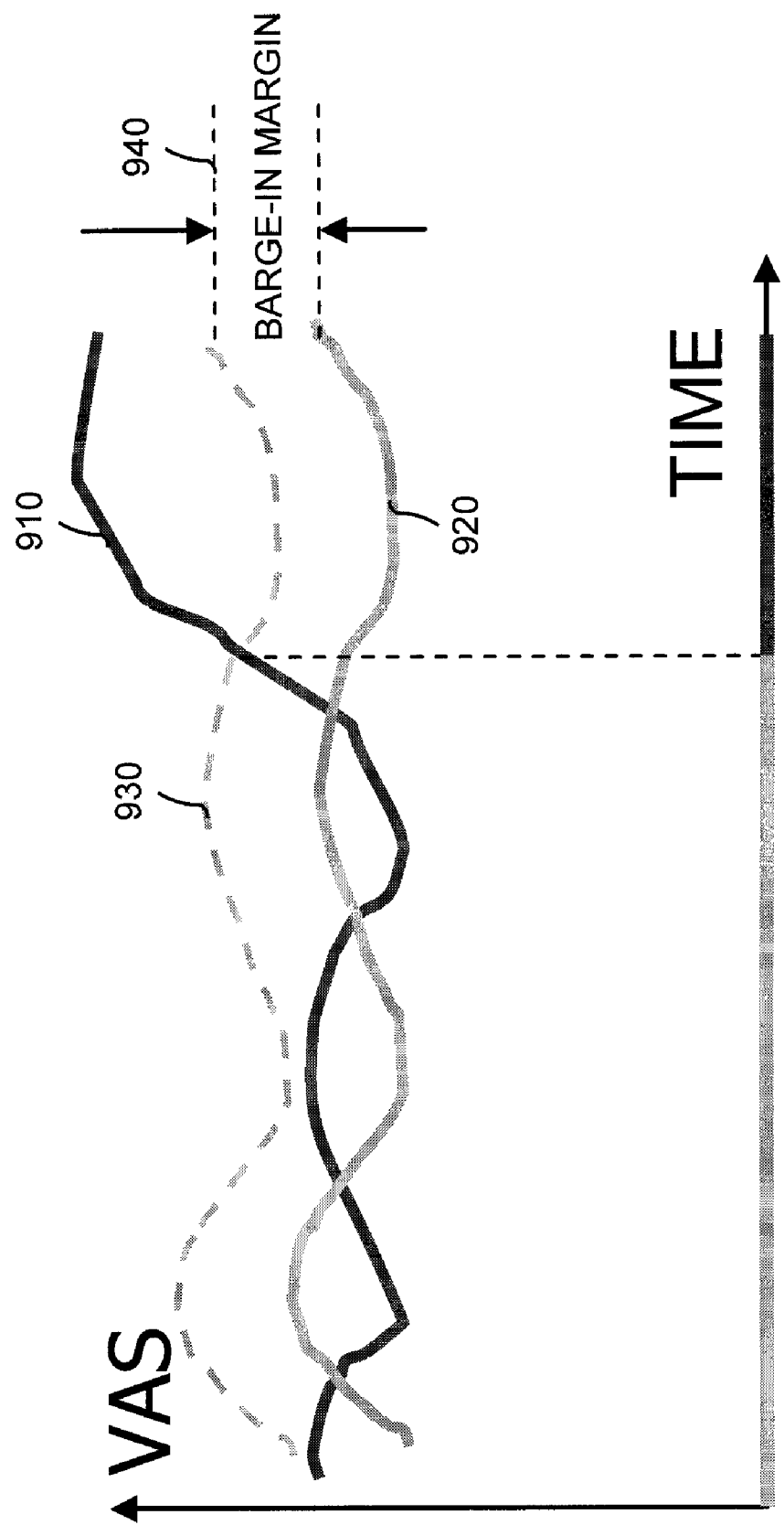
FIG. 9 illustrates the concept of the barge-in mechanism.

FIG. 9 illustrates the concept of the barge-in mechanism. The situation shown in FIG. 9 is where M=1 speaker is selected from N=2 clients. More specifically, a first client has a first VAS 90, and a second client (which is the current speaker) has a second VAS 90. As can be seen in FIG. 9 if the speaker with higher VAS is always selected, spurious speaker switching will happen frequently. In fact, there will be 5 switches.

The "barge-in" mechanism is an effective method to prevent this kind of spurious switching. As shown in FIG. 9 a barge-in threshold 930 is defined as the current speaker's VAS (in this case, the second VAS 920) plus a certain additional percentage of the current speaker's VAS 920. The interrupter (or first client) may suppress the current speaker (the second client) only if its VAS (the first VAS 910) is higher than the second VAS 920 by at least a margin, which is called the barge-in margin 940. Thus, the barge-in threshold 930 is defined as the current speaker's VAS 920 plus the barge-in margin 940. For the example shown in FIG. 9, by using the barge-in threshold there is only one switch between speakers, as compared with 4 switches when not using the barge-in process.

Figure 10:
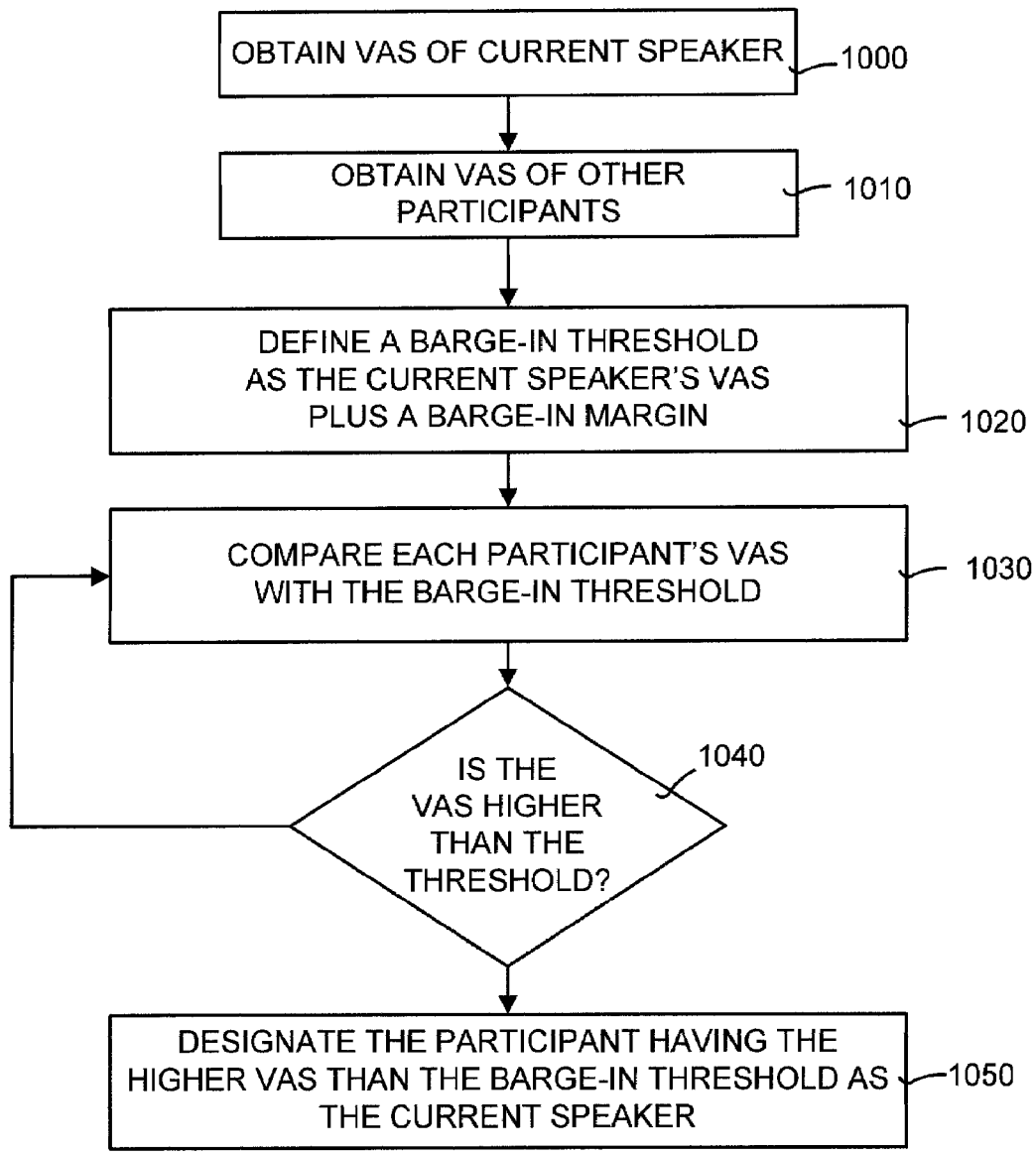
FIG. 10 is a detailed flow diagram illustrating the details of the barge-in process shown in FIG. 9.

FIG. 10 is a detailed flow diagram illustrating the details of the barge-in process shown in FIG. 9. The VAS of a current speaker is obtained (box 1000). Next, the VAS of other participants in the voice conference is obtained (box 1010). The barge-in threshold then is defined as the current speaker's VAS plus a barge-in margin (box 1020).

Each participant's VAS is compared with the computed barge-in threshold (box 1030). For each participant, the VAS is compared to determine whether it is higher that the barge-in threshold (box 1040). If so, then the participant is designated as a current speaker (box 1050) and starts sending its own signal. If not, then for each audio frame, the process is repeated.

It should be noted that because of the delay in receiving other participants' scores, it may occur that more than M speakers will be simultaneously sending a signal at some point. This transient mode will not last very long, since as soon as the old active client start to receive the new stream, it will realize its own signal is now weaker and will cease transmission, at least for the moment.

V. Exemplary Operating Environment

The decentralized computer network architecture and method is designed to operate in a computing environment. The following discussion is intended to provide a brief, general description of a suitable computing environment in which the decentralized computer network architecture and method may be implemented.

Figure 11:
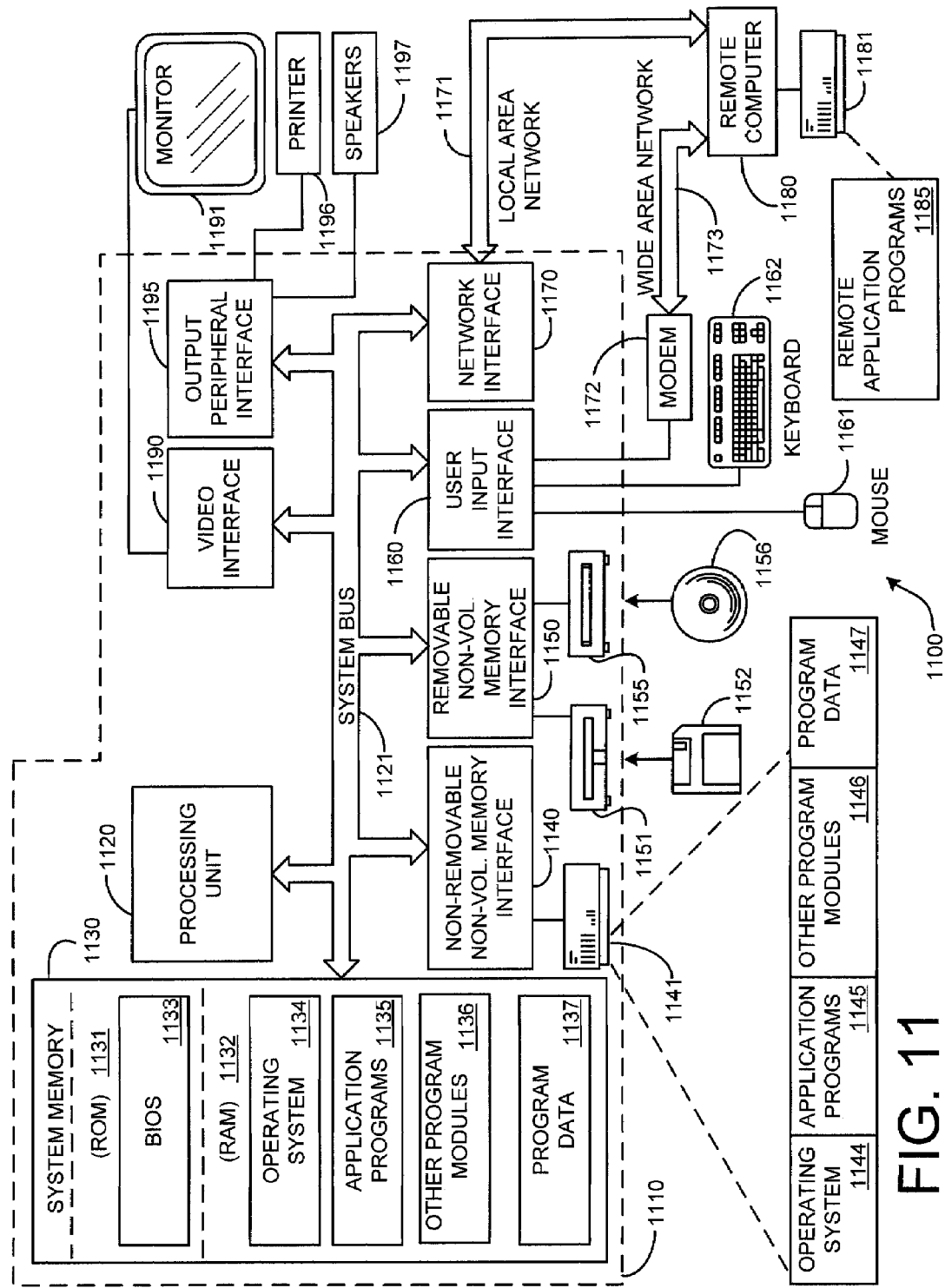
FIG. 11 illustrates an example of a suitable computing system environment in which the decentralized computer network architecture and method may be implemented.

FIG. 11 illustrates an example of a suitable computing system environment in which the decentralized computer network architecture and method may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

The decentralized computer network architecture and method is operational with numerous other general purpose or special purpose computing system environments or configurations. Examples of well known computing systems, environments, and/or configurations that may be suitable for use with the decentralized computer network architecture and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The decentralized computer network architecture and method may be described in the general context of computer-executable instructions, such as program modules, being executed by a computer. Generally, program modules include routines, programs, objects, components, data structures, etc., that perform particular tasks or implement particular abstract data types. The decentralized computer network architecture and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for decentralized computer network architecture and method includes a general-purpose computing device in the form of a computer 1110.

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 737. Operating system 744, application programs 745, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for deciding when to send a local audio packet residing on a local client over a computer network, comprising:
    computing a local voice activity score of the local audio packet by computing a voiceness score, which indicates a likelihood that the local audio packet contains speech or voice, and by computing an energy level score, which indicates a ratio of current frame energy to a long-term average of energy for a current speaker;
    gathering remote voice activity scores from remote clients, wherein the local and remote clients are in communication with the computer network; and
    using the local client to decide, based on the local and remote voice activity scores, when to send the local audio packet from the local client over the computer network.

2. The method of claim 1, further comprising having at least two remote clients in communication with the computer network in addition to the local client.

3. The method of claim 1, further comprising ranking the local client and the remote clients based on the local and remote voice activity scores.

4. The method of claim 3, further comprising:
    determining a simultaneous speaker value, M, that indicates the number of simultaneous speakers in a voice conference using the computer network; and
    sending the local audio packet over the computer network when the local client ranking is in the top M clients.

5. A computer-readable storage medium having computer-executable instructions for deciding whether to send an audio packet of a local client over a computer network, comprising:
    computing, on local client that is in communication with computer network, a voice activity score for the audio packet to obtain a local voice activity score, the computing of the local voice activity score further comprising:
        computing Mel-frequency Cepstral Coefficients (MFCC) for each audio packet;
        computing a voiceness score of the local voice activity score, which indicates a likelihood that the audio packet contains speech or voice, by using the Mel-Frequency Cepstral Coefficients;
        computing an energy level score of the local voice activity score, which indicates a ratio of current frame energy to a long-term average of energy for a current speaker, by using the Mel-Freguency Cepstral Coefficients;
        combining the voiceness score and the energy level score to obtain the local voice activity score;
    obtaining remote voice activity scores of a plurality of remote clients in communication with the computer network; and
    computing a local ranking of the local client relative to the remote clients using the local and remote voice activity scores; and
    comparing the local ranking to a simultaneous speaker value, M, to determine whether to send the audio packet of the local client over the computer network;
    wherein the plurality of remote clients is at least two.

6. The computer readable medium of claim 5, further comprising sending the audio packet from the local client over the computer network if the local ranking is among the top M of the rankings.

7. The computer-readable medium of claim 6, further comprising not sending the audio packet from the local client over the computer network if the local ranking is not among the top M of the rankings.

8. The computer-readable medium of claim 6, further comprising inhibiting a client ranked in the top $M^{th}$ of the rankings from sending over the computer network by the local client sending the audio packet from the local client over the computer network.

9. The computer-readable medium of claim 5, further comprising varying the simultaneous speaker value, M, based on current network traffic and available bandwidth bandwidth, such that M decreases with higher network traffic and less available and M increases with lower network traffic and higher more available bandwidth.

10. The computer-readable medium of claim 6, further comprising using a bridge in communication with the computer network to forward the audio packet to plurality of remote clients without performing any mixing.

11. The computer-readable medium of claim 10, further comprising:
    generating a list of clients, from the plurality of remote clients, that are in direct communication with local client; and
    sending the audio packet only to those plurality of remote clients not on the list of clients.

12. The computer-readable medium of claim 11, further comprising sending the list over the computer network along with the audio packet.

13. A decentralized computer network architecture, comprising:
    a plurality of remote clients in communication with the computer network, each of the plurality of remote clients containing a remote scoring module that computes a remote voice activity score based on the content of each of the remote clients;

a local client in communication with the computer network, further comprising:
- a local scoring module that computes a local voice activity score based on local content of the local client by computing Mel-Frequency Cepstral Coefficients (MFCC) for each audio packet, computing a voiceness score of the local voice activity score, which indicates a likelihood that the audio packet contains speech or voice, by using the Mel-Frequency Cepstral Coefficients and concatenating the MFCC and their first and second order temporal differences into a 39-dimension feature vector, computing an energy level score of the local voice activity score, which indicates a ratio of current frame energy to a long-term average of energy for a current speaker, by using the Mel-Frequency Cepstral Coefficients and by normalizing a current frame energy by computing a running average of energy for a current speaker and dividing the current frame energy by the running average of energy for the current speaker, and combining the voiceness score and the energy level score to obtain the local voice activity score;
- a remote information module that receives the remote voice activity scores of plurality of remote clients; and
- a decision module that, based on the local and remote voice activity scores, decides locally whether to send the local content over the computer network.

14. The decentralized computer network architecture of claim 13, wherein the local content and the content of each of the remote clients are at least one of:
(a) audio packets; (b) video packets.

15. The decentralized computer network architecture of claim 14, wherein the local client further comprises a ranking module that ranks the local and remote clients based on their voice activity scores.

16. The decentralized computer network architecture of claim 15, further comprising a ranking computed by the ranking module that is used by the decision module when deciding locally whether to send the local content over the computer network.

17. The decentralized computer network architecture of claim 13, wherein the plurality of remote clients is greater than or equal to two.

18. The decentralized computer network architecture of claim 17, further comprising a bridge in communication with the computer network that forwards any received content from the local and remote clients and does not perform mixing of the received content.

19. The decentralized computer network architecture of claim 18, further comprising a list of clients to whom the bridge does not need to forward the local content, wherein the list of clients is a subset of the plurality of remote clients.

\* \* \* \* \*

UNITED STATES PATENT AND TRADEMARK OFFICE
CERTIFICATE OF CORRECTION

| | | |
|---|---|---|
| PATENT NO. | : 7,417,983 B2 | Page 1 of 1 |
| APPLICATION NO. | : 11/277905 | |
| DATED | : August 26, 2008 | |
| INVENTOR(S) | : Li-wei He et al. | |

It is certified that error appears in the above-identified patent and that said Letters Patent is hereby corrected as shown below:

In column 16, line 8, in Claim 5, delete "frequency" and insert -- Frequency --, therefor.

In column 16, line 16, in Claim 5, delete "Freguency" and insert -- Frequency --, therefor.

In column 16, line 44, in Claim 9, after "bandwidth" delete "bandwidth".

In column 16, line 46, in Claim 9, after "available" insert -- bandwidth --.

Signed and Sealed this
Twenty-sixth Day of April, 2011

David J. Kappos
*Director of the United States Patent and Trademark Office*